July 30, 1963  C. W. ROSE  3,099,331
SAFETY AND SUPPORTING BELT CONSTRUCTIONS
Filed April 3, 1961  3 Sheets-Sheet 1
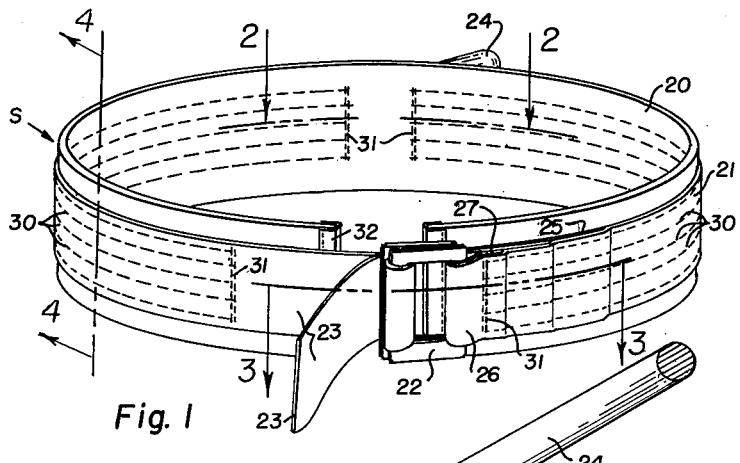
Fig. 1
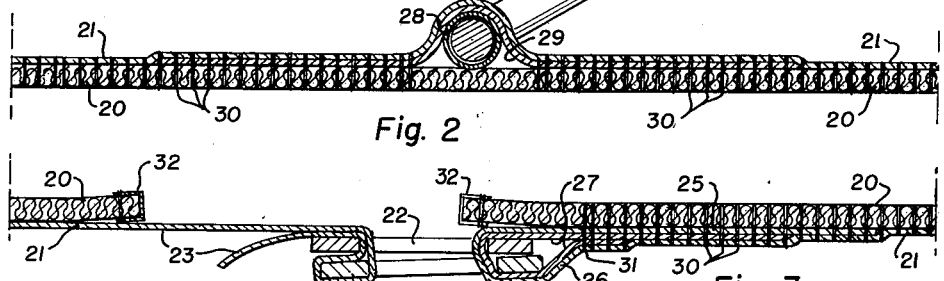
Fig. 2
Fig. 3
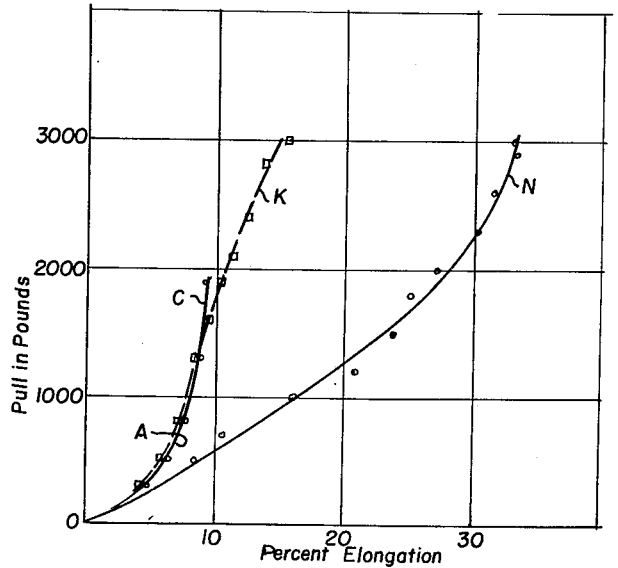
Fig. 5
INVENTOR.
Clarence W. Rose
BY WHITEHEAD, VOGL & LOWE
PER *Frank C. Lowe*
ATTORNEYS July 30, 1963  C. W. ROSE  3,099,331
SAFETY AND SUPPORTING BELT CONSTRUCTIONS
Filed April 3, 1961  3 Sheets-Sheet 3

INVENTOR.
Clarence W. Rose
BY WHITEHEAD, VOGL & LOWE
PER Frank C. Lowe
ATTORNEYS 3,099,331
Patented July 30, 1963

1

3,099,331
SAFETY AND SUPPORTING BELT
CONSTRUCTIONS
Clarence W. Rose, Denver, Colo., assignor to Rose Manufacturing Company, Denver, Colo., a corporation of Colorado
Filed Apr. 3, 1961, Ser. No. 100,328
3 Claims. (Cl. 182—3)

This invention relates to safety and supporting belts for workmen and more particularly to improved constructions of safety and supporting belts which may be required to check the fall of a workman. One object of the invention is to provide a novel and improved construction of a safety belt and a supporting belt which uses small, high-strength straps or webs of nylon or other synthetic material having generally similar properties. For convenience such materials will be hereinafter referred to as nylon.

The very high strength of nylon fibers would make it appear that nylon ropes and webs would practically replace older types of cotton and manila hemp ropes and webs because comparable nylon products are stronger, smaller, lighter, usually much easier to store and handle, and they are even cheaper. However, such has not occurred in many instances because of several undesirable properties of nylon. For example, nylon is highly elastic and the surface of a nylon rope or web can be deceptively hard and at the same time very smooth and slippery. In many applications which use a rope or a web, a gripping or a non-slick surface is needed and often it is important that the stretch be a minimum. For such applications, the bulkier cotton or manila ropes and webs are still in use.

This situation exists in the construction of belts and cradles for supporting workmen and especially in safety belts. Such safety and supporting belts of the types herein considered will include a body band adapted to be affixed about the waist of a wearer and which will carry rings or the like for attachment to supporting lines or a lanyard. The lanyard will be required to check a fall of the wearer and it is essential that the body band be strong enough to withstand the shock incurred in checking a fall and at the same time not to stretch to a point where the wearer could slip out of it. To appreciate this need, it must be realized that the forces which occur in checking a fall may be in excess of 2,000 pounds.

Moreover, in such equipment it is desirable that the body band and other bands which support a wearer be comparatively wide and of stiff but yieldable, non-slip material to provide at least a degree of comfort to the wearer. To meet such requirements, the better conventional types of safety and supporting belts customarily have a comparatively wide and stiff body pad, preferably of cotton webbing or leather. A buckle cannot be satisfactorily applied to such a wide, stiff pad and a short length of smaller, more pliable strap is sewn at each end of the body pad with one length carrying the buckle and the other length forming the connecting tongue. Another construction is to encircle the body pad with a smaller, more pliable web which carries the buckle and other attachment fixtures and this encircling web is either tacked to the body pad or fastened to it by sliding loops.

Because of its strength, nylon webs have been proposed for such belts but they are not satisfactory. In the first place, nylon is too hard and slippery for an inner wrap or body pad where a wide non-slip wearing surface is required. Also, a small nylon band having sufficient strength to withstand the forces encountered as in checking a fall is entirely too elastic. Moreover, a nylon web large enough to be sufficiently stiff and unstretchable would be unreasonably expensive and bulky.

2

It was with such considerations in view that the present invention was conceived and developed, and this invention comprises in essence, a belt construction which combines and effectively laminates both cotton and nylon webbing in a novel and improved arrangement which takes advantage of the desirable characteristics of both materials as in a manner hereinafter set forth. Furthermore, it was discovered that the combination of cotton and nylon webbing could be advantageously arranged to form a novel construction of a supporting belt arrangement which takes advantage of the desirable characteristics of both materials as in a manner hereinafter set forth. Furthermore, it was discovered that the combination of cotton and nylon webbing could be advantageously arranged to form a novel construction of a supporting belt arrangement of the boatswain's chair type.

It follows that another object of the invention is to provide a novel and improved belt construction for safety and supporting belt which advantageously incorporates and effectively laminates cotton and nylon webbing into a compact, strong, stiff and reasoanbly comfortable unit.

Another object of the invention is to provide a novel and improved safety belt having the stiffness and comparative comfort of a conventional type belt and the strength, compactness and light weight which is possible only with nylon webbing.

Another object of the invention is to provide a novel and improved construction for supporting belts and cradles which combines the stiffness and comparative comfort of conventional cotton webbing with the strength and compactness possible only with the use of nylon webbing.

Another object of the invention is to provide a novel and improved webbing construction for strain-resisting belt and the like by operationally and functionally combining and laminating a cotton web with a nylon web.

Another object of the invention is to provide a novel and improved construction for a supporting belt-cradle unit of the boatswain's chair type support, by the combined use of cotton and nylon webbing in a simple, strong, compact and easily-worn arrangement and by a simplified manner of overfolding and combining the webs forming the unit.

Further objects of the invention are to provide a novel and improved construction for safety and supporting belts and cradles which is strong, neat-appearing, easily manufactured, economical, rugged and durable.

With the foregoing and other objects in view, all of which more fully hereinafter appear, my invention comprises certain constructions, combinations and arrangements of parts and elements as hereinafter described, defined in the appended claims and illustrated in preferred embodiments in the accompanying drawing, in which:

FIGURE 1 is a front elevational, perspective view of a workman's safety belt which is constructed according to the invention and with the belt being positioned in a circle as it would appear when being worn although not in a fully cinched-up position.

FIGURE 2 is a fragmentary sectional view as taken from the indicated line 2—2 at FIG. 1 but on an enlarged scale and with the belt portion being illustrated as being flat.

FIGURE 3 is a fragmentary sectional view as taken from the indicated line 3—3 at FIG. 1, but on an enlarged scale and with the belt portion being illustrated as being flat.

FIGURE 5 is a graph illustrating the strength and stretch characteristics of the materials forming the improved safety belt and the characteristic of these materials when they are combined in accordance with the principles of the invention.

Figure 6:
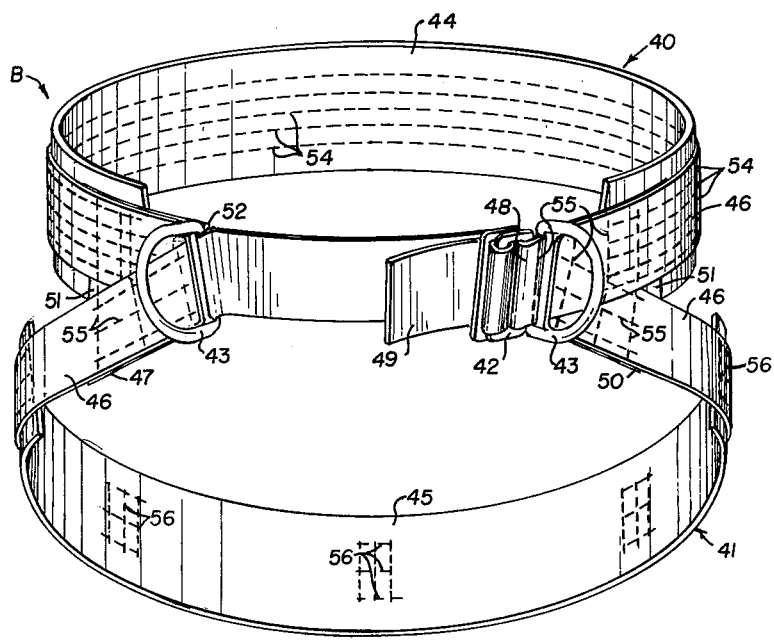
FIGURE 6 is a front elevational perspective view of an improved construction of a belt-cradle unit of the boatswain's chair type with the unit, hereinafter referred to as a boatswain's chair, being positioned as it would appear when being worn but not being in a fully cinched-up position.

Referring more particularly to the drawing and to FIGS. 1 to 4 thereof, the invention may be applied to the construction of a single-band type safety belt S. This belt is of a conventionalized form and is representative of several common types of safety belts which will vary in their construction from the type illustrated only by different arrangements of connectors and the like. This belt includes an inner band or web which serves as a body pad 20 and an outer web or strap 21 which carries the buckle and other connectors. It is the load-carrying strap of the safety belt.

The belt S is worn about the waist of a worker with the body pad 20 being against the body of the worker and being embraced by the strap 21. It is, therefore, important that this body pad 20 be comparatively wide, somewhat stiff and free of irregularities in order to provide a maximum degree of comfort to the wearer.

The present invention contemplates a body pad 20 made of a tightly woven cotton web of the general type which is commonly used as machine belting material. It has been found that a good size for a body pad is a 3-inch, 4-ply web of this type. The webbing is approximately $\frac{3}{16}$-inch thick and while it may be bent it is comparatively stiff. It is an ideal material for a body pad because of the width, the stiffness and also, because of the surface being essentially a non-slip surface.

In conventional types of safety belts, similar materials have been used for body pads. Such body pads are ordinarily too stiff to be buckled and more pliable straps must be used for this purpose. In one type of safety belt, a second strap will encircle the body pad to carry the buckle. The strap will be either tacked to the body pad at a few points or it will be threaded through loops to hold it in place. In another conventional type, short lengths of pliable straps are sewn to each end of the body pad to hold the buckle and provide a connecting tongue therefor. In this construction strength is an important consideration when using the body pad. A new cotton webbing of the size specified when used in this manner will have a breaking strength approaching 2,000 pounds. However, it must be realized that wear and exposure will reduce the strength of this web to a degree which cannot be predicted. Cotton is especially susceptible to mildew and rot and the strength of such a belt could conceivably be reduced as much as 90 percent without being apparent.

In the present invention the load-carrying strap 21 embraces the body pad and one end is looped to carry a buckle such as the two ring buckle 22 illustrated. The other end of this strap comprises an overlapping or tongue portion 23 which may be threaded into the buckle to fasten and tighten the belt upon the wearer. Connectors such as a D-ring 24 are affixed to this strap 21. A single D-ring 24 may be conveniently positioned on the strap at the back of the belt. However, it may also be located at either side of the belt and the belt may even include a pair of D-rings with one being at each side of the belt.

The load-carrying strap 21 is of nylon webbing. The size of this strap is determined primarily by the load which might be imposed upon it when a workman's fall is suddenly checked. Since the force might be in excess of 2,000 pounds a good design with a safety factor would provide for a strap able to resist an even greater breaking force, say in excess of 3,000 pounds. A nylon strap 2 inches wide and $\frac{1}{16}$ inch thick will adequately meet such a specification. In use, the D-ring 24 is suitably connected to a lanyard or other anchor means and it follows that the strength of the strap 21 and the D-ring 24 connected thereto must be able to withstand the loads on the belt which would occur if a worker wearing the belt were to fall and to have his fall suddenly checked by the lanyard attached to the belt.

The strap 21 is affixed to the pad as hereinafter described, to embrace the body pad 20 when the belt is being worn, and the ends of the pad and strap are adjacent to each other as shown at FIG. 1. One end 25 of the strap is turned upon itself to lie between the strap and pad to form a loop 26 wherein the buckle rings 22 are mounted. This loop is reinforced by a short wear pad 27 which is preferably the same size as strap 26 and is folded between the strap 21 and its end 25 to form the inner portion of the loop 26 as clearly illustrated at FIG. 3. The strap 21, the underlaid end 25, and the ends of the wear pad 27 are sewn tightly to the strap 21 and to the body pad by stitching as hereinafter described.

The D-ring 24 is threaded upon the strap 21 to its proper position before the strap is affixed to the body pad 20. This ring is normally swingable about its base leg, and to prevent wear this leg is preferably mounted in a sleeve 28. In proper position this sleeve will be snugly held between the strap 27 and body pad 20. However, it is preferred to reinforce the strap 21, so a second short wear pad 29 is used, with the reinforcement pad lying between the strap and body pad and about the sleeve 28 and with the assembly held in position by stitching, as clearly illustrated at FIG. 2.

The apparent objection to the organization above described lies in the high elasticity of the comparatively small nylon web, for the stretch will exceed 30 percent of its length when it is fully loaded. On the other hand, the cotton webbing is comparatively unstretchable. This is illustrated graphically at FIG. 5 where the stretch of the selected nylon web for various loads is indicated by the solid line curve N. The strength of 3,000 pounds is adequate for a safety belt but the stretch exceeding 33 percent of its length is excessive. A safety belt stretching to the extent indicated by the curve N would not be safe, for a worker wearing the belt could easily slip out of it when his fall was being checked.

Also this stretch of the nylon web is so completely different from the stretch of the cotton web that the webs would ordinarily separate from each other. The stretch characteristics of the larger cotton web are indicated by the solid curve C at FIG. 5. It is to be noted that when the cotton web 20 is loaded under tension that it will at first easily stretch to a value of approximately 7 percent of its length, as to point A of the curve C. This initial stretch is possibly a taking-up of slack of the weave of the web. However, with additional loading the web resists further stretching and when loaded to its breaking point, about 1,900 pounds, the total stretch will not exceed approximately 9 percent of its length.

The present invention advantageously combines these webs by virtually laminating them together to gain the desirable rigidity, or resistance to stretching, of the body pad and the desirable strength of the nylon web into a single unit.

To accomplish this, the webs 20 and 21 are stitched together with high-strength nylon thread through out their entire length insofar as possible by a plurality of rows of stitching 30. The purpose of this method of stitching is to create a new-combined material. Such stitching cannot occur at the exact location of the buckle and of the D-ring. However, the wear pad 27 at the buckle and wear pad 29 at the D-ring rigidifies these sections against stretching. This leaves only one point where stretch can occur, at the short adjustment reach of the body pad adjacent to the tongue 23, which will be cinched-up and shortened from the position shown at FIG. 1 when the bolt is being worn. Moreover, the adjustment reach underneath the tongue 23 may be held to a minimum by proportioning the belt to various sizes as needed for different wearers.

Figure 4:
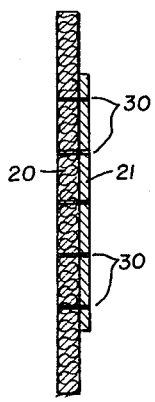
FIGURE 4 is a transverse sectional detail as taken from the indicated line 4—4 at FIG. 1, but on an enlarged scale.
Figure 8:
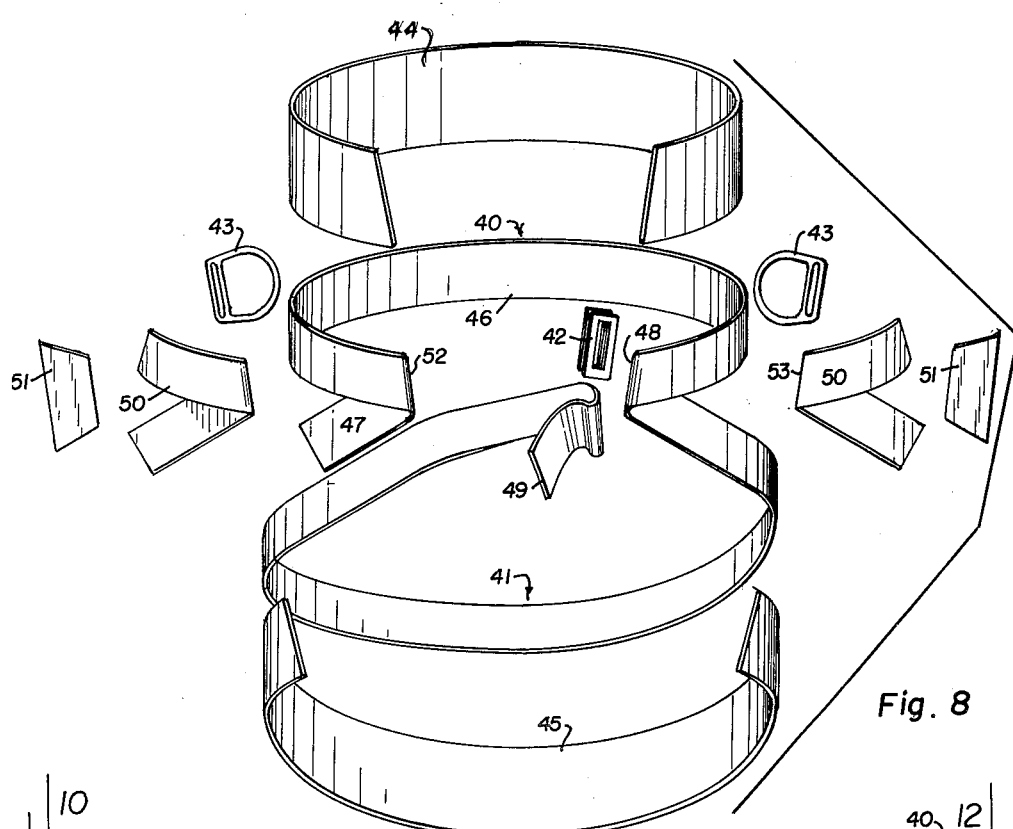
FIGURE 8 is an exploded, front elevational view of the components forming the boatswain's chair illustrated at FIGS. 6 and 7, with the components being arranged to appear in a position similar to the positioning at FIG. 6.

Five stitch rows 30 are illustrated, as at FIG. 4, but a greater number of rows may be used to increase the strength of the connection between the webs. Also, the pattern of stitching may be varied to form diagonal or criss-cross rows if desired. By this combination a new laminated type of strap is created having essentially the strength of the nylon strap and the rigidity of the cotton web.

The characteristics of the stitch-connected, or laminated, web pad 20 and strap 21 are illustrated at FIG. 5 by the broken line curve K. The curve demonstrates that the pad-strap combination has essentially the strength of the nylon strap but the rigidity and stretch limitation feature of the cotton pad. More specifically, this loading curve K demonstrates that the pad-strap laminate combines the desirable features of both straps, the resistance to streching of the cotton web pad 20 and the strength of the nylon strap 21. The pad-strap laminate will resist a load of 3,000 pounds without elongating more than 15 percent. This is less than half the elongation of the nylon strap used alone.

To finish the safety belt thus described, the longitudinal stitching 30 may be reinforced with suitable rows of transverse stitching 31 as at the head of the loop 26 and at the ends of the stitching rows 30. Also, the ends of the web pad may be finished with cover edges 32 sewn thereto to prevent unraveling while the ends of the nylon strap 21 may be finished by a heat sealing operation.

Figure 7:
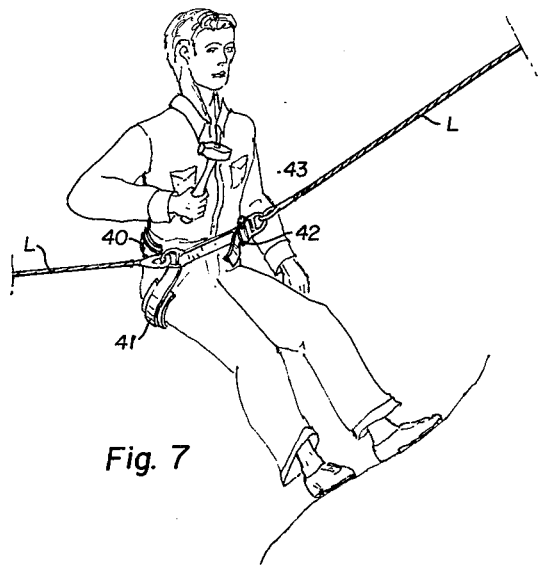
FIGURE 7 is a sketch of a workman wearing the boatswain's chair and with the chair being connected to suitable lanyards as when in use.

The boatswain's chair B illustrated at FIGS. 6 and 7 is one type of a supporting belt which is ideally suited to be made by the cotton web pad and nylon strap combination as hereinbefore described. Moreover, the chair is formed by a unique arrangement of a single strap member to produce a neat, light weight unit which has sufficient strength and stability to also serve as a safety belt should it be required to check the fall of a workman.

The general form of the boatswain's chair B is a combination of a waist belt 40 and a seat loop 41 beneath the belt. The ends of the loop are joined to the sides of the waist belt. The waist belt is conventionally fastened at its front by a buckle 42 and is conventionally attached to lanyards L or similar supporting ropes by D-rings 43 as illustrated at FIG. 7. These lanyards will ordinarily extend from each side of the belt to support workman on a steep slope, they may hang as from a boom or the like to suspend the workman. The workman will don this boatswain's chair by fastening the waist belt 40 snugly about his waist and when he is standing the seat loop 41 will fit in a somewhat loose manner at his back. However, when the workman assumes a sitting or leaning position such as illustrated at FIG. 7 he will actually place the weight of his body in this seat loop and the chair will comfortably support him so that he will have ample freedom to move his legs and arms in performing his duties while sitting in the chair.

The waist belt 40 of this boatswain's chair includes a body pad 44 of a woven cotton web such as the pad 20 heretofore described. The seat loop 41 also includes a seating pad 45 of a woven cotton web of the same material. These webs are held in position by a single load-carrying strap 46 of nylon webbing which embraces the body pad 44 and is overfolded at the sides of the chair to also reach about the seating pad 45 as hereinafter set forth.

The load-carrying strap 46 commences at the chair at one side thereof as an underfolded tab 47, at one end of the body pad 44, which is preferably the right side, as shown in the drawing. Thence, the strap encircles the pad 44 to the opposite side of the chair. At this side it forms an underfold loop 48 to extend therefrom at an angle of approximately 45 degrees to extend downwardly towards the seat pad 45. Thence, the strap 46 embraces the seat pad to extend upwardly towards the tab 47. The strap 46 overlies and is affixed to the tab 47 to complete the loops forming the waist belt 40 and the seat loop 41.

Thence the strap extends from the connection at the tab 47 and across the front portion of the belt to terminate as a tongue 49. The tongue 49 is adjustably connected to the buckle 42 and the buckle is threaded upon the strap 46 and is positioned at the loop 48.

The connection points between the belt and seat loop, at the tab 47 and at the underfold of the strap forming the loop 48, are suitably reinforced and the D-rings 43 are located at these points. The reinforcement includes two short folded strap sections which serve as wear pads 50 since they are adapted to underlie the strap 46 at the underfolded corners and carry the D-rings 43. The reinforcement also includes two flat strap lengths 51 which are adapted to underlie the strap 46 adjacent to the folds and to hold the folds at an angle which properly inclines the seat loop 41 with respect to the waist belt 40, the angle being about 45 degrees.

Figure 9:
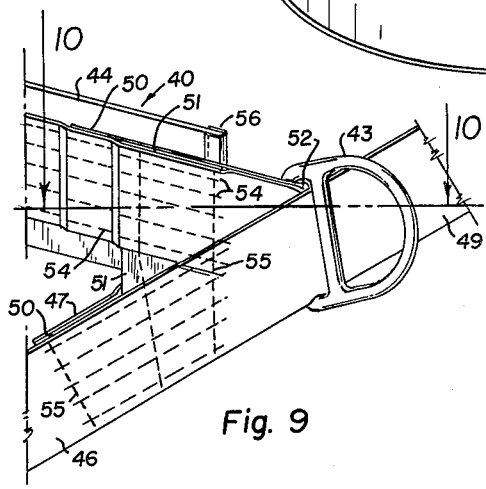
FIGURE 9 is an enlarged fragmentary perspective view of the strap connections at one side of the boatswain's chair.
Figure 10:
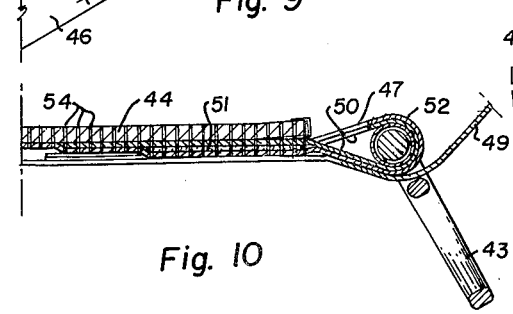
FIGURE 10 is a fragmentary sectional detail as taken from the indicated line 10—10 at FIG. 9 but on a further enlarged scale.

The right hand side D-ring 43 is threaded upon the strap 46 and upon a folded wear pad 50 to be positioned at a loop 52 formed by the underfolded tab 47 and the wear pad 50 at the side of the unit, as clearly illustrated at FIGS. 9 and 10. The left hand side D-ring 43 is threaded upon the other wear pad 50 to lie in the fold loop 53 of that wear pad. Thence, the D-ring is threaded over, but not in, the loop 48 at the opposite side of the unit for this loop 48 combines the buckle 48 as clearly illustrated at FIGS. 11 and 12.

This arrangement of elements forming the chair is joined by stitching the strong nylon thread, as hereinbefore described, by using longitudinally disposed rows of stitching 54 to join the pad 44 to the strap 46 and transverse rows of stitching 55 to form the loop 48, secure the reinforcing members in place and to close the end portions of the longitudinal rows of stitching. As aforestated, the pattern of stitching may be changed from that shown to other arrangements as desired.

The waist belt 40 is thus an effective safety belt embodying the combination of the stretch-resisting body pad 44 and the high strength nylon webbing 41, in the same manner as is the combination of the web 20 and strap 21 of the safety belt S, hereinbefore described. The cotton pad 44 is laminated to the strap 46 by continuous stitching 54 through the usual reach of the belt length, while the strap portions holding the D-rings and buckle are doubled and rigidified by overfolding and by the wear pads 50. It follows that only the tongue portion 49 of the strap 46 across the front of the belt is not rigidified and in wear this portion is cinched-up from the position illustrated at FIG. 6 to be of a minimum length.

The pad 45 extends across bottom portion of the seat loop with unreinforced portions of the strap 46 at each side of the loop reaching to the belt. These unreinforced strap portions provide needed flexibility to the seat loop. On the other hand, the seat loop is used only for seating a worker and not to hold a man in case of a fall. The webs need not be laminated together and the stitching may be ordinary spot stitching 56 as illustrated.

Figure 11:
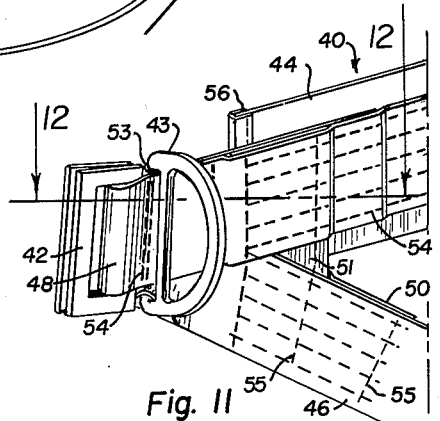
FIGURE 11 is an enlarged fragmentary perspective view of the strap connections at the other side of the boatswain's chair.
Figure 12:
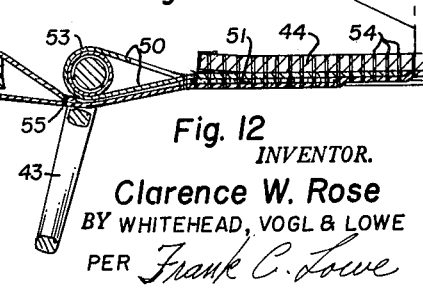
FIGURE 12 is a fragmentary sectional detail as taken from the indicated line 12—12 at FIG. 11 but on a further enlarged scale.

This boatswain's chair may include appurtenances not shown and it is anticipated that the cotton straps may be finished with a cover edge 56 as shown at FIGS. 9 and 11 and that the nylon strap 46 may have its ends finished by heat sealing.

I have now described my invention in considerable detail, but it is obvious that others skilled in the art can devise and build alternate and equivalent constructions of safety and supporting belts which are within the spirit and scope of my invention. Hence, I desire that my protection be limited not by the constructions illustrated and described but only by the proper scope of the appended claims.

I claim:

1. A safety belt adapted to be fastened about the waist of a wearer, of the type having an inner web of comparatively wide, stiff material forming a body pad and an outer web of smaller, flexible material forming a body-circling load-carrying strap, and a buckle adapted to engage the ends of the said body-circling load-carrying strap to form a closed body loop with the body pad being within the loop, wherein said body pad is a web of cotton or like material woven to be resistant to stretching but of limited strength, wherein said load-carrying strap is a web of nylon or like material having high strength, and being more elastic than the body pad and wherein said web and strap are laminated together throughout substantially their entire length by a continuous array of permanent stitching sufficient to combine the web and strap to form a unitary band having the stiffness of the web and the strength of the strap.

2. In the belt defined in claim 1, wherein one end of the strap is folded upon itself to lie between the strap and web to form a buckle-carrying loop, and a second shorter reach of web folded upon itself and with a substantial portion of the ends thereof being adapted to lie between the strap fold loop and to extend into the permanent stitching to form a wear pad and to rigidify the strap at the loop.

3. In the belt defined in claim 1, wherein a connective D-ring is affixed to the strap between the strap and the web with a wear pad fixed about the D-ring and with each end of the wear pad extending between the strap and the web and in the reach of the continuous stitching.

References Cited in the file of this patent

UNITED STATES PATENTS

| | | |
|---|---|---|
| 2,521,203 | Cotton | Sept. 5, 1950 |
| 2,613,865 | Rose | Oct. 14, 1952 |
| 2,651,446 | Rose | Sept. 8, 1953 |